Dec. 16, 1930. J. C. SHAW ET AL 1,785,395
ZEROIZING SCALE FOR WORK POSITIONING MECHANISM FOR MACHINE TOOLS
Filed Jan. 3, 1928
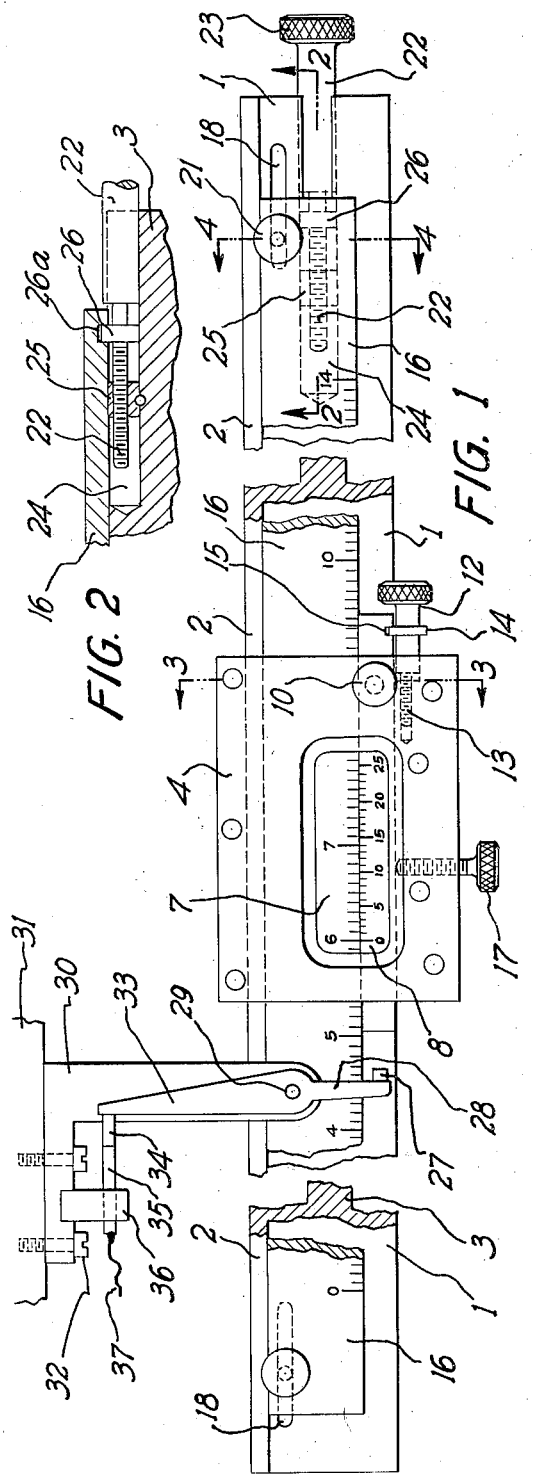
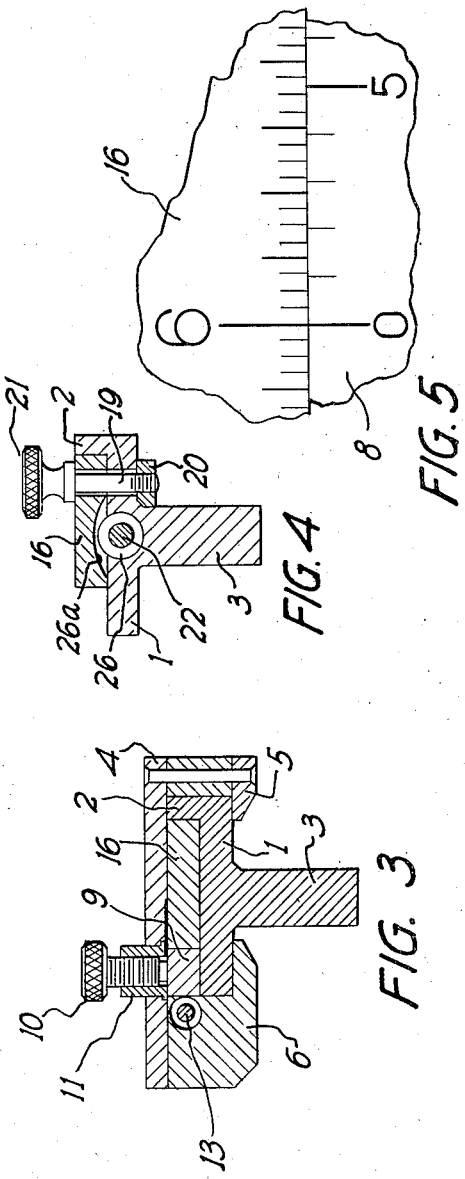
INVENTORS
John C. Shaw and
BY Robert D. Shaw
M. H. Lockwood
ATTORNEY Patented Dec. 16, 1930

1,785,395

UNITED STATES PATENT OFFICE

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK

ZEROIZING SCALE FOR WORK-POSITIONING MECHANISM FOR MACHINE TOOLS

Application filed January 3, 1928. Serial No. 244,167.

This invention relates more particularly to means for and permitting independent adjustment of the graduated scale, relative to its associated vernier for zeroizing the origin in a laying out system for machine tools, such as described in our co-pending application, Ser. No. 35,959, filed June 9, 1925, Patent No. 1,757,929, May 6, 1930, for laying out system.

In applying our improved laying out system to machine tools of various types, it has been found preferable to use a graduated scale adapted to be read by means of an associated vernier mounted on a sliding block or slider, movable longitudinally of the scale support.

In establishing the origin or original zero position of the work table, the slide block is adjusted arbitrarily with reference to the scale and permitted to engage the contact carrying member to break the circuit of the magnetic clutch controlling the feed movement of the work, and from this origin, the measurements for locating the various points to be operated upon are laid out by use of the graduated scale, the slider and vernier being moved longitudinally thereof. Obviously, the initial, arbitrarily selected position of the slider, which becomes the origin (or zero position) for the desired measurements for locating the work will not always be such that the zero of the vernier coincides with one of the major graduations of the scale, such as the inch or centimeter marks. Therefore, the primary object of our improvement is to provide for longitudinal adjustment of the graduated scale, relative to the vernier (and slider) after the latter has been located and secured in the initial zero position or origin, from which the laying out measurements are made.

Ordinarily, in providing vernier sliders for and associated with graduated scales it is desirable to mount the slider directly upon the scale, but in the present instance, it has been found preferable to mount the vernier block and slider on a track or support secured to the work table or bed of the machine tool parallel to the direction of motion of the work, so that the slider may be slid longitudinally of the scale, which is mounted on the same support and adapted for independent longitudinal movement along the track, relative to the slider and vernier carried thereby. By this construction, it will be seen that the vernier slider and graduated scale are so mounted on the work table or bed that each may be adjusted relative to the other to thereby facilitate the setting of a major graduation of the scale at the zero point of the vernier.

In carrying out our improvement, a further object is to provide a knurled head adjusting device for fine adjustment of the graduated scale longitudinally, relative to the vernier, and the provision of clamping screws or other devices for firmly securing the graduated scale in adjusted position.

One form and adaptation of our improved graduated scale and vernier, applied to our laying out system for machine tools is shown in the accompanying drawings, in which Fig. 1 is a plan view of graduated scale and vernier slider, in association with the contact carrying member, with parts broken away; Fig. 2 is a vertical longitudinal section showing a detail of the graduated scale adjusting device, the section being taken on the line 2—2 of Fig. 1; Fig. 3 is a transverse section through the slider on the line 3—3 of Fig. 1; Fig. 4 is a transverse section on the line 4—4 of Fig. 1, showing a detail of the clamp for the graduated scale, and Fig. 5 is a broken away portion of the scale and vernier, much enlarged.

Referring to the drawings, a support, comprising a track 1 is preferably formed by milling or otherwise, with an angle portion 2 on the T-head of a bracket 3, secured to or forming part of the bed or of the work table of a machine tool or laying out table, upon which the work to be operated upon is adapted to be clamped or secured, in the ordinary manner. On the support or track 1 and over the angle piece 2, there is preferably mounted a vernier carrying slide block or slider 4, provided with undercut slide surfaces 5 and 6, engaging the underside of the T-track 1, as shown in Fig. 3. The slider 4 is provided with a window or opening 7 for viewing a vernier 8, which is graduated on a bar 9, carried by the slider and slidably mounted on the track 1 and adapted to be clamped thereto by means of a knurled screw 10, as indicated in Fig. 3. The knurled screw 10 is threaded into a thimble 11 mounted in the slider 4, so that when the vernier scale 9 is clamped in position, the slider will be clamped to the T-head track 1. For connecting the vernier and slider, the usual knurled screw 12 is threaded at 13 in the slide block 4 and provided with an annular projection 14, engaging a notch 15 in the vernier bar 9, thereby providing for fine adjustment of the latter when so required.

Mounted on the T-head track 1, between the angle piece 2 and the vernier bar 9, is the graduated scale 16, which may be graduated in inches and fractions thereof, or centimeters and millimeters, for cooperation with the vernier 8, the relations therebetween being preferably such that, when inches are used, the vernier will give readings to the one-thousandth of an inch. In order that the graduations on the vernier may not be too close together, it is preferable to have twenty-five graduations of the vernier cover seventy-four (fortieths of an inch) graduations on the scale, which as shown in Fig. 1, and enlarged in Fig. 5, is graduated in tenths and fortieths, thus giving readings to thousandths of an inch with coincidences covering three scale divisions for each thousandth. A knurled head screw 17 may be mounted in the front of the slide block 4 for clamping the vernier bar 9 and the graduated scale 16 to the support or track, when so required.

As previously indicated, the preliminary or initial setting of the slider 4, in that it is arbitrary, may be such that the zero of the vernier 8 does not coincide with the inch marks or major graduations on the graduated scale 16. This, it will be understood, would not introduce an error into the calculations, but simply would provide an unwieldly fraction or decimal to be carried along in every succeeding measurement from that origin, in locating the points to be spotted or laid out. Therefore, to obviate this objection, the graduated scale 16, in the present instance, is mounted on the track 1—2, so as to permit sliding the scale longitudinally, relative to the vernier 8, to thereby bring one of the major graduations into line with the zero of the vernier.

Various mechanical arrangements may be devised for effecting this relative adjustment, but preferably the T-head of the track 1, along which the graduated scale slides, is provided with longitudinally extending slots 18, through which clamping screws 19 extend, after passing through the graduated scale 16, as shown in Fig. 4. The screws 19 are threaded into a nut 20 on the underside of the T-head of track 1 and the upper end of each screw is provided with a knurled head 21, whereby the graduated scale 16 may be clamped in any adjusted position.

For adjusting the graduated scale 16 longitudinally along the supporting track 1, a screw 22, having a knurled head 23, is mounted in a recess or pocket 24 in the T-head of the track 1, the screw being threaded through a nut 25, secured in the recess 24 of the track in any suitable manner. The shank of the screw 22 carries an annular flange 25, adapted to engage a notch in the underside of the graduated scale 16, as more particularly shown in Fig. 2. From this arrangement, it will be seen that, by turning the screw 22, the graduated scale 16 can be shifted longitudinally of the track 1, to bring the inch marks or major graduations into coincidence with the zero of the vernier 8. After the graduated scale 16 has been shifted in this manner, it may be clamped in the adjusted position by the clamp screws 19, as previously described. Obviously, the slots 18, for adjusting the graduated scale 16, may be made of any desired length, but ordinarily, when a scale graduated in inches is used, a length of slightly more than an inch will be ample for any adjustment that may be required.

The bar 9, having the vernier 8 cooperating with the graduated scale 16 is, as previously described, mounted in a slide block or slider 4, and is adapted to cooperate with a hardened stud 27, mounted on the end of an arm 28, forming part of the contact carrying member, pivotally mounted at 29 on a bracket 30; the latter being secured to the frame 31 of the machine, by screws 32, as indicated in Fig. 1. The rear lever arm 33 of the contact carrying member, represented as much longer than the arm 28, carries a contact 34 cooperating with a contact 35 mounted in an insulating support 36; the contact 35 being connected, by the lead 37, in circuit with the magnetic clutches controlling the feed motion of the work table, with which the track 1 is preferably associated, as previously described.

The operation of our improved laying out system for machine tools is fully described in the pending application, herebefore referred to, and has become fairly well known to the trade through public use and demonstration of machine tools and laying out tables equipped with our laying out system. From the foregoing description, however, it will be understood that if a plurality of holes are to be spotted or drilled in a jig or other piece of work, the bed or work table, with the work attached thereto, should first be moved to some arbitrary position, for the origin or initial zero, and the slider 4 slid along the track 1 and clamped at the proper starting position relative to the work. The work table is then permitted to move, under the feed motion of the magnetic clutch, until the circuit is broken at the contacts 34—35, by engagement of the vernier bar 9 with the stud 27. This establishes the initial zero or origin, from which the subsequent measurements for the holes to be spotted or drilled are made. If, for example, this initial position of the vernier block is such as to give a vernier reading of 5.341 and the distance from the origin for the first hole is 2.5, this latter amount added to the previous reading (5.341) would carry along an unwieldy decimal. With our improvement, however, the clamping screws 19 are loosened by turning the knurled heads 21, after which, by means of the knurled head 23, the graduated scale 16 can be shifted longitudinally to bring the nearest inch graduations "6" into alignment with the zero graduation of the vernier 8, as indicated in Figs. 1 and 5, thereby eliminating the decimal fraction of the original zero setting. Obviously, after the graduated scale 16 has been adjusted or zeroized for any origin, as many points or holes may be located from the established origin or zero as may be required, without any further adjustment of the graduated scale 16, which should be clamped in adjusted position by the screws 19.

It will be seen that the arrangement of the slide block or slider 4 is such that by means of the knurled head screw 10, the vernier bar 9 and the slider may be clamped to the track 1, thus leaving the graduated scale 16 free to slide longitudinally for adjustment thereof relative to the vernier, and after such adjustment, the vernier bar may be clamped firmly to the graduated scale 16 by the knurled screw 17.

It will be understood that, while we have shown our improved zero setting graduated scale and vernier arrangement in connection with our laying out system, the device may be adapted for and utilized in connection with various types of machine tools and work tables and, therefore, we do not wish to be limited to the specific details of construction here shown, for these may be varied without departing from the spirit and scope of the invention.

We claim:—

1. A zeroizing scale for work positioning mechanism for machine tools wherein a work table is movable relative to the tool, comprising a graduated scale, means for supporting said scale on the work table parallel to the direction of motion thereof, a slide-way on said supporting means, a slide block mounted on said slide-way for adjustment along the scale, a vernier bar on said slide block adjustable relative to said scale, means for clamping the vernier bar to the slide-way in any adjusted position relative to the scale, a lever, carrying contacts controlling motion of the work table, located in position to be actuated by said vernier bar, as the latter moves with the work table, to open the contacts and stop said motion, and means for adjusting said scale relative to the vernier bar, after the latter has stopped motion of the work table, for zeroizing the scale, whereby the work may be positioned by adjusting the vernier bar according to measurements from the zero of the zeroized scale.

2. A zeroizing scale for work positioning mechanism for machine tools as in claim 1, wherein means is provided for clamping said scale to its supporting means after adjustment of the scale relative to the vernier bar, thereby preventing shifting of the zeroized scale while the vernier bar is adjusted relative to the scale according to measurements on the zeroized scale for positioning the work.

3. A zeroizing scale for work positioning mechanism for machine tools wherein the work table and tool are relatively movable, comprising a graduated scale, a support for said scale adapted to extend parallel to the direction of relative motion, a slide-way on said support longitudinally of said scale, a slide block on said slide-way, a vernier bar on said slide block for cooperation with the scale, means for clamping the vernier bar and slide block to the slide-way in any adjusted position along the scale, a contact carrying lever located in position to be actuated by said vernier bar by relative motion of the work table and tool to stop said motion, means for adjusting said scale relative to the vernier bar after the latter engages said contact carrying lever and stops the motion, for zeroizing the scale and means for clamping the scale in the zeroized position, whereby measurements for positioning the work are thereafter made by adjusting the vernier bar along the zeroized scale.

4. A zeroizing scale for work positioning mechanism for machine tools as in claim 3, wherein means is provided for clamping the vernier bar and the scale together after relative adjustment therebetween.

5. A zeroizing scale for work positioning mechanism for machine tools wherein the work table is movable relative to the tool, comprising a graduated scale, a support for said scale adapted to be mounted on the work table parallel with the direction of motion thereof, a slide-way formed on said support, a slide block mounted on said slide-way for adjustment longitudinally of the scale, a vernier bar mounted on said block for cooperation with said scale in any position of adjustment of the slide-block, means for clamping the vernier bar and slide block to the slide-way in any adjusted position and a contact carrying lever adapted to be actuated by said vernier bar for stopping motion of the work table and positioning the work according to measurements set up by adjustment of said vernier bar along the zeroized scale.

JOHN C. SHAW.
ROBERT D. SHAW.